US012669854B2

(12) United States Patent
Lin et al.

(10) Patent No.: US 12,669,854 B2
(45) Date of Patent: Jun. 30, 2026

(54) OPTIMIZATION METHOD FOR HEAT DISSIPATION CONTROL OF GPU ACCELERATOR CARDS, ELECTRONIC DEVICE, AND STORAGE MEDIUM

(71) Applicants: INVENTEC (PUDONG) TECHNOLOGY CORPORATION, Shanghai (CN); INVENTEC CORPORATION, Taipei (TW)

(72) Inventors: Hai-Xiang Lin, Shanghai (CN); Lian-Fei Zhang, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 418 days.

(21) Appl. No.: 18/387,021

(22) Filed: Nov. 4, 2023

(65) Prior Publication Data

US 2025/0076941 A1 Mar. 6, 2025

(30) Foreign Application Priority Data

Aug. 30, 2023 (CN) .......................... 202311112097.0

(51) Int. Cl.
*G06F 1/20* (2006.01)
(52) U.S. Cl.
CPC .................................... *G06F 1/206* (2013.01)

(58) Field of Classification Search
CPC ...... G06F 1/206; G06F 11/3058; Y02D 10/00
See application file for complete search history.

(56) References Cited

U.S. PATENT DOCUMENTS

| | | | | |
|---|---|---|---|---|
| 2015/0019711 A1* | 1/2015 | Zhang | .................. | G06F 1/206 |
| | | | | 709/224 |
| 2016/0306400 A1* | 10/2016 | Kawamura | ............. | G06F 1/206 |
| 2020/0097055 A1* | 3/2020 | Wang | .................. | G05B 15/02 |
| 2020/0097056 A1* | 3/2020 | Wang | .................. | G05B 19/406 |
| 2020/0323102 A1* | 10/2020 | Artman | ............. | H05K 7/20172 |
| 2021/0132679 A1* | 5/2021 | Zhu | ......................... | G05B 11/42 |
| 2021/0333849 A1* | 10/2021 | Kennedy | ........... | H05K 7/20209 |

* cited by examiner

*Primary Examiner* — Christopher E. Everett

(57) ABSTRACT

Disclosed is an optimization method for heat dissipation control. An information reading frequency and an optimized heat dissipation control cycle of each GPU accelerator card are obtained. A maximum number of information readings of each GPU accelerator card within one optimized heat dissipation control cycle is obtained according to the information reading frequency and the optimized heat dissipation control cycle. Other information, in addition to the temperature information, to be read during a current heat dissipation control cycle is determined, so that the sum of the temperature information and other information to be read does not exceed the maximum number of information readings. An information reading instruction is generated and transmitted to each GPU accelerator card according to the temperature information and other information to be read. In each optimized heat dissipation control cycle, a fan speed is adjusted according to the temperature information received from each GPU accelerator card.

15 Claims, 6 Drawing Sheets

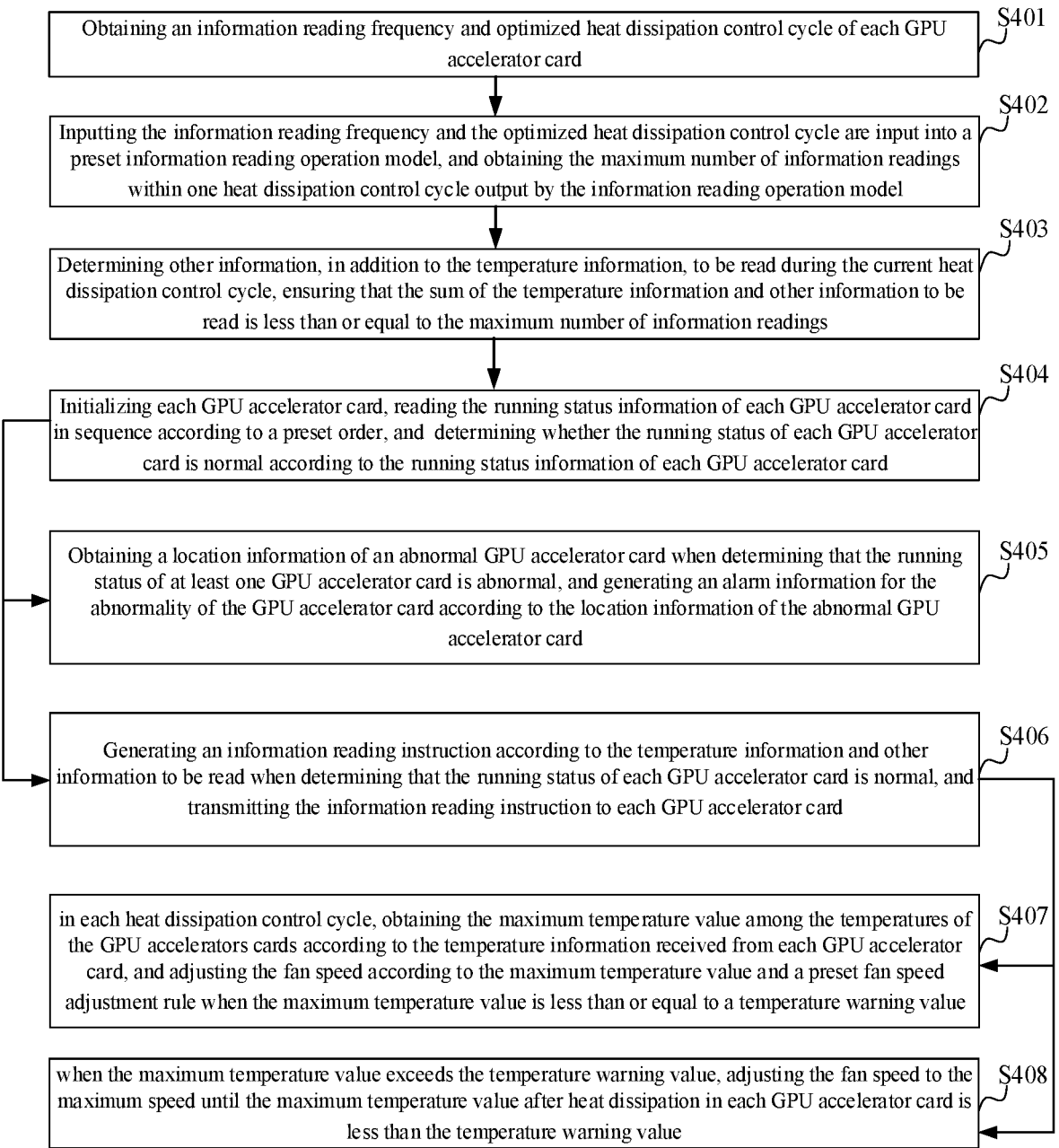

Obtaining an information reading frequency and optimized heat dissipation control cycle of each GPU accelerator card
S401

Inputting the information reading frequency and the optimized heat dissipation control cycle are input into a preset information reading operation model, and obtaining the maximum number of information readings within one heat dissipation control cycle output by the information reading operation model
S402

Determining other information, in addition to the temperature information, to be read during the current heat dissipation control cycle, ensuring that the sum of the temperature information and other information to be read is less than or equal to the maximum number of information readings
S403

Initializing each GPU accelerator card, reading the running status information of each GPU accelerator card in sequence according to a preset order, and determining whether the running status of each GPU accelerator card is normal according to the running status information of each GPU accelerator card
S404

Obtaining a location information of an abnormal GPU accelerator card when determining that the running status of at least one GPU accelerator card is abnormal, and generating an alarm information for the abnormality of the GPU accelerator card according to the location information of the abnormal GPU accelerator card
S405

Generating an information reading instruction according to the temperature information and other information to be read when determining that the running status of each GPU accelerator card is normal, and transmitting the information reading instruction to each GPU accelerator card
S406 in each heat dissipation control cycle, obtaining the maximum temperature value among the temperatures of the GPU accelerators cards according to the temperature information received from each GPU accelerator card, and adjusting the fan speed according to the maximum temperature value and a preset fan speed adjustment rule when the maximum temperature value is less than or equal to a temperature warning value
S407 when the maximum temperature value exceeds the temperature warning value, adjusting the fan speed to the maximum speed until the maximum temperature value after heat dissipation in each GPU accelerator card is less than the temperature warning value
S408

FIG. 4

OPTIMIZATION METHOD FOR HEAT DISSIPATION CONTROL OF GPU ACCELERATOR CARDS, ELECTRONIC DEVICE, AND STORAGE MEDIUM

CROSS-REFERENCE TO RELATED DISCLOSURES

This application claims priority to Chinese patent application No. 2023111120970 filed with the Chinese Patent Office on Aug. 30, 2023, entitled "OPTIMIATION METHOD AND DEVICE FOR HEAT DISSIPATION CONTROL OF GPU ACCELERATOR CARDS, DEVICE, MEDIUM, AND PRODUCT", the entire content of which is incorporated by reference.

TECHNICAL FIELD

The present disclosure relates to the technical field of heat dissipation, and particularly to an optimization method for heat dissipation control of GPU accelerator cards, a computer device, and a storage medium.

BACKGROUND

Currently, graphics processing unit (GPU) accelerator cards have been widely used in the field of computer technology. The computing performance and execution efficiency of computers equipped with the GPU accelerator cards are improved, and the computers can be used to accelerate various computing tasks such as deep learning training, data mining, and big data analysis. However, since the GPU accelerator cards generate a large amount of heat when performing high-intensity calculations, an effective heat dissipation solution is required to ensure their stable operation.

SUMMARY

In a first aspect, the present disclosure provides an optimization method for heat dissipation control of GPU accelerator cards. In the method, an information reading frequency and an optimized heat dissipation control cycle of each GPU accelerator card are obtained. A maximum number of information readings of each GPU accelerator card within one optimized heat dissipation control cycle is obtained according to the information reading frequency and the optimized heat dissipation control cycle. Other information, in addition to the temperature information, to be read during a current heat dissipation control cycle is determined, so that the sum of the temperature information and other information to be read is less than or equal to the maximum number of information readings. An information reading instruction is generated and transmitted to each GPU accelerator card according to the temperature information and other information to be read. In each optimized heat dissipation control cycle, a fan speed is adjusted according to the temperature information received from each GPU accelerator card.

In some embodiments, before the generating the information reading instruction according to the temperature information and other information to be read and transmitting the information reading instruction to each GPU accelerator card, the method further includes: initializing each GPU accelerator card, reading a running status information of each GPU accelerator card in sequence according to a preset order, and determining whether the running status of each GPU accelerator card is normal according to the running status information of each GPU accelerator card. The generating the information reading instruction according to the temperature information and the other information to be read and transmitting the information reading instruction to each GPU accelerator card includes: generating the information reading instruction according to the temperature information and the other information to be read when determining that the running status of each GPU accelerator card is normal, and transmitting the information reading instruction to each GPU accelerator card.

In some embodiments, the method further includes obtaining a location information of an abnormal GPU accelerator card when determining that the running status of at least one GPU accelerator card is abnormal, and generating an alarm information for an abnormality of the GPU accelerator card according to the location information of the abnormal GPU accelerator card.

In some embodiments, the adjusting the fan speed according to the temperature information received from each GPU accelerator card includes: obtaining a maximum temperature value among the temperatures of the GPU accelerator cards according to the temperature information received from each GPU accelerator card, and adjusting the fan speed according to the maximum temperature value and a preset fan speed adjustment rule when the maximum temperature value is less than or equal to a temperature warning value.

In some embodiments, the method further includes, when the maximum temperature value exceeds the temperature warning value, adjusting the fan speed to a maximum speed until the maximum temperature becomes less than the temperature warning value due to heat dissipation of each GPU accelerator card.

In some embodiments, the obtaining the maximum number of information readings of each GPU accelerator card within one heat dissipation control cycle according to the information reading frequency and the optimized heat dissipation control period includes inputting the information reading frequency and the optimized heat dissipation control cycle into a preset information reading quantity calculation model, and obtaining the maximum number of information readings within one heat dissipation control cycle output by the information reading quantity calculation model.

In a second, the present disclosure also provides a computer device. The computer device includes a memory and a processor, the memory stores a computer program. The processor, when executing the computer program, performs steps of an optimization method for heat dissipation control of GPU accelerator cards. In the method, an information reading frequency and an optimized heat dissipation control cycle of each GPU accelerator card are obtained. A maximum number of information readings of each GPU accelerator card within one optimized heat dissipation control cycle is obtained according to the information reading frequency and the optimized heat dissipation control cycle. Other information, in addition to the temperature information, to be read during a current heat dissipation control cycle is determined, ensuring that the sum of the temperature information and other information to be read is less than or equal to the maximum number of information readings. An information reading instruction is generated and transmitted to each GPU accelerator card according to the temperature information and other information to be read. In each optimized heat dissipation control cycle, a fan speed is adjusted according to the temperature information received from each GPU accelerator card.

In a third aspect, the present disclosure also provides a non-transitory computer-readable storage medium. The computer-readable storage medium has a computer program stored therein, and when the computer program is executed by a processor, steps of an optimization method for heat dissipation control of GPU accelerator cards are performed. In the method, an information reading frequency and an optimized heat dissipation control cycle of each GPU accelerator card are obtained. A maximum number of information readings of each GPU accelerator card within one optimized heat dissipation control cycle is obtained according to the information reading frequency and the optimized heat dissipation control cycle. Other information, in addition to the temperature information, to be read during a current heat dissipation control cycle is determined, so that the sum of the temperature information and other information to be read is less than or equal to the maximum number of information readings. An information reading instruction is generated and transmitted to each GPU accelerator card according to the temperature information and other information to be read. In each optimized heat dissipation control cycle, a fan speed is adjusted according to the temperature information received from each GPU accelerator card.

BRIEF DESCRIPTION OF THE DRAWINGS

FIG. 4 is a schematic flowchart of an optimization method for heat dissipation control of GPU accelerator cards according to a specific embodiment;

DETAILED DESCRIPTION OF THE EMBODIMENTS

In order to make the purpose, technical solutions, and advantages of the present disclosure more clear, the present disclosure will be further described in detail below with reference to the drawings and embodiments. It should be understood that the specific embodiments described herein are only used to explain the present disclosure and are not to limit the present disclosure.

The terms "first", "second", etc., in the specification and figures of the present disclosure are used to distinguish different objects, or to distinguish different processes for the same object, rather than to describe a specific sequence of objects. As used herein, the singular forms "a" "an" and "this/the" may also include plural forms, unless otherwise clearly indicated.

As known to the applicant, the GPU accelerator card needs to read all its own information in sequence during a heat dissipation control cycle. However, due to the limitation of the reading frequency of the GPU accelerator card and the large amount of information that needs to be read, the heat dissipation control cycle is very long. As a result, the Baseboard Management Controller (MBC) is unable to obtain the temperature information of each GPU accelerator card in time, which will cause a certain security risk to the operation of the GPU accelerator cards.

Figure 1:
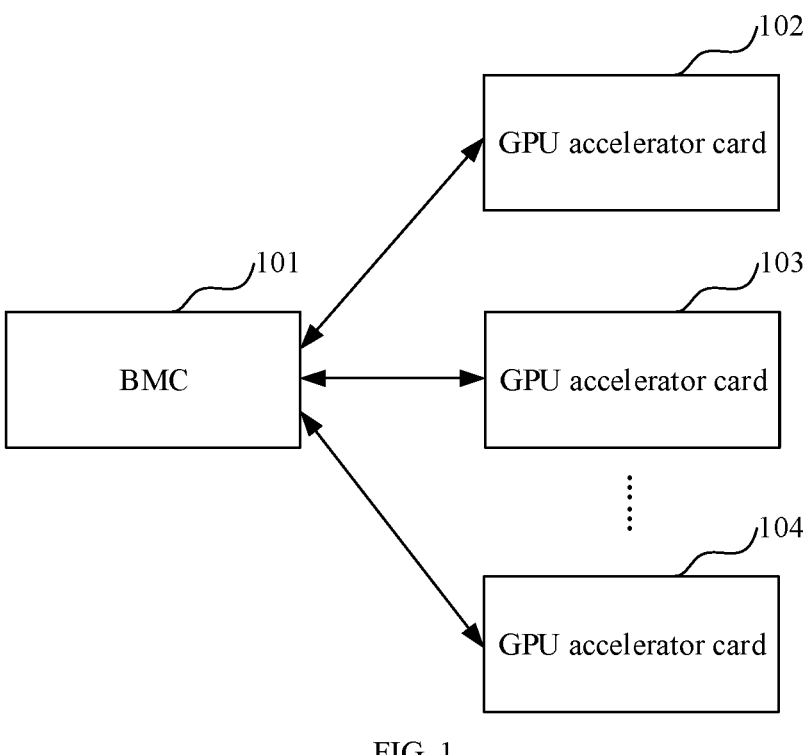
FIG. 1 is an application environment diagram of an optimization method for heat dissipation control of GPU accelerator cards according to an embodiment.

An optimization method for heat dissipation control of GPU accelerator cards provided by the embodiments of the present disclosure can be applied in an application environment as shown in FIG. 1. A BMC 101 communicates with a first GPU accelerator card 102, a second GPU accelerator card 103, and a third GPU accelerator card 104 respectively through a network.

In some embodiments, the optimization method for heat dissipation control of the GPU accelerator cards provided by the embodiments of the present disclosure can be executed by the BMC 101.

For instance, the BMC 101 obtains an information reading frequency and optimized heat dissipation control cycle of each GPU accelerator card. Based on the information reading frequency and the optimized heat dissipation control cycle, the maximum number of information readings of each GPU accelerator card within one heat dissipation control cycle is obtained. The BMC 101 determines other information, in addition to the temperature information, to be read during the current heat dissipation control cycle, ensuring that the total number of the temperature information and the other information to be read is less than or equal to the maximum number of the information readings of each GPU accelerator card. The BMC 101 generates an information reading instruction according to the temperature information and the other information to be read, and transmits the instruction to each GPU accelerator card. The BMC 101 adjusts, in each heat dissipation control cycle, the fan speed according to the temperature information received from each of the GPU accelerator cards.

In the application environment shown in FIG. 1, the BMC 101 is equipped with a hardware interface and a software interface, follows the intelligent platform management interface (IPMI) protocol, and provides a unified access interface to external parties. As a specific module of a server, the MBC 101 further monitors the temperature, the voltage, the fan, and the bus. The MBC 101 further provides a management interface to facilitate remote management of the server. The first GPU accelerator card 102, the second GPU accelerator card 103, and the third GPU accelerator card 104 may be separate expansion cards that can be inserted into specific slots in a computer. The GPU accelerator cards are configured to accelerate various computing tasks and are equipped with large-capacity video memory and high-speed interfaces.

Figure 2:
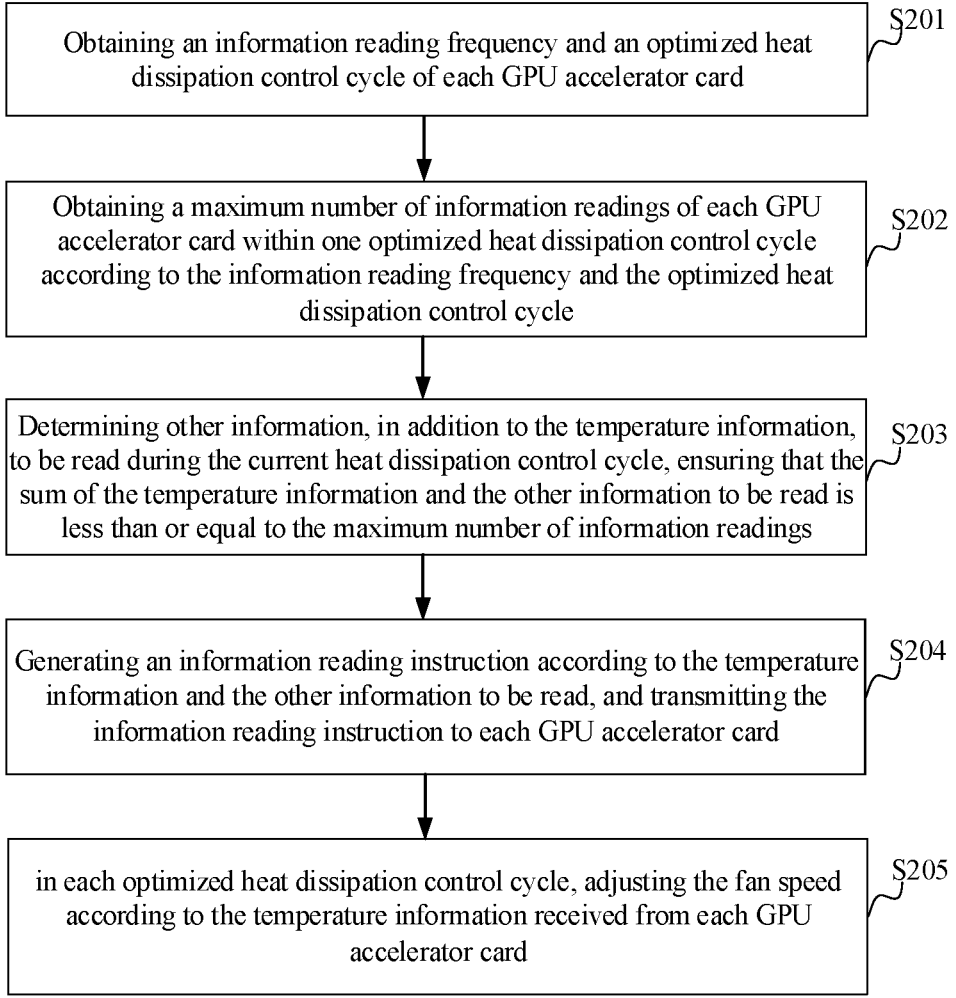
FIG. 2 is a schematic flowchart of an optimization method for heat dissipation control of GPU accelerator cards according to an embodiment.

In some embodiments, as shown in FIG. 2, an optimization method for heat dissipation control of GPU accelerator cards is provided. Taking this method applied to the BMC 101 in FIG. 1 as an example, the method includes the following steps.

In step S201, an information reading frequency and an optimized heat dissipation control cycle of each GPU accelerator card are obtained.

In some embodiments, the information reading frequency of each GPU accelerator card is set to read information every 200 milliseconds. Due to the limitation of the GPU accelerator card itself, after reading one piece of information, it needs to wait for 200 milliseconds before reading the next piece of information.

In some embodiments, an original heat dissipation control cycle in the related art is 4 seconds, while the optimized heat dissipation control cycle in the present disclosure needs to be reduced to 1 second or less.

Specifically, the BMC 101 obtains the information reading frequency and the optimized heat dissipation control cycle of the GPU accelerator cards in response to an information obtaining instruction.

In step S202, the maximum number of information readings of each GPU accelerator card within one optimized heat dissipation control cycle is obtained according to the information reading frequency and the optimized heat dissipation control cycle.

In the case that the information reading frequency is set to read information every 200 milliseconds and the optimized heat dissipation control cycle is 1 second, the maximum number of information readings of the GPU accelerator card is 5 within one optimized heat dissipation control period.

Specifically, the BMC 101 inputs the information reading frequency and the optimized heat dissipation control cycle into a preset information reading quantity calculation model, and obtains the maximum number of information readings within one optimized heat dissipation control cycle output by the information reading quantity calculation model.

In step S203, other information, in addition to the temperature information, to be read during the current heat dissipation control cycle is determined, ensuring that the sum of the temperature information and the other information to be read is less than or equal to the maximum number of information readings.

The other information to be read may be power consumption information, frequency information, bandwidth information, etc.

Specifically, the BMC 101 determines other information, in addition to the temperature information, to be read during the current heat dissipation control cycle, ensuring that the sum of the temperature information and other information to be read is less than or equal to the maximum number of information readings.

For example, if the maximum number of information readings of a GPU accelerator card within one heat dissipation control cycle is 5, the maximum number of other information, except the temperature information, to be read during the current heat dissipation control cycle is 4.

In step S204, an information reading instruction is generated and transmitted to each GPU accelerator card according to the temperature information and the other information to be read.

Specifically, the BMC 101 generates a corresponding information reading instruction according to the temperature information and the other information to be read, transmits the information reading instruction to each GPU accelerator card respectively, and receives the information read by each GPU accelerator card.

In step S205, in each optimized heat dissipation control cycle, the fan speed is adjusted according to the temperature information received from each GPU accelerator card.

Specifically, in each optimized heat dissipation control cycle, for each running GPU accelerator card, the BMC101 receives the temperature information returned by each running GPU accelerator card and adjusts the fan speed based on the received temperature information.

To further explain, in a heat dissipation control cycle, if the computer does not use all of the equipped GPU accelerator cards, the BMC101 can also query the temperature information of one or more running GPU accelerator cards (i.e., the GPU accelerator cards required by the computer) as needed.

In the above optimization method for heat dissipation control of the GPU accelerator cards, the information reading frequency and the optimized heat dissipation control cycle of each GPU accelerator card are obtained. Based on the information reading frequency and the optimized heat dissipation control cycle, the maximum number of information readings of each GPU accelerator card within one heat dissipation control cycle is obtained. Other information, in addition to the temperature information, to be read during the current heat dissipation control cycle is determined, ensuring that the sum of the temperature information and other information to be read is less than or equal to the maximum number of information readings. According to the temperature information and other information to be read, an information reading instruction is generated and transmitted to each GPU accelerator card. In each optimized heat dissipation control cycle, the fan speed is adjusted according to the temperature information received from each GPU accelerator card. In this way, by shortening the heat dissipation control cycle, the BMC can read the temperature information of each GPU accelerator card first, and then read other information of the GPU accelerator card after a period of time, thus ensuring that the BMC can still read and monitor the temperature information in time under high load pressure on the GPU, achieving timely response of the system fan to changes in the temperatures of the GPU accelerator cards, thus effectively preventing the over-temperature of the GPU accelerator cards and eliminating safety hazards caused by high temperature.

Figure 3:
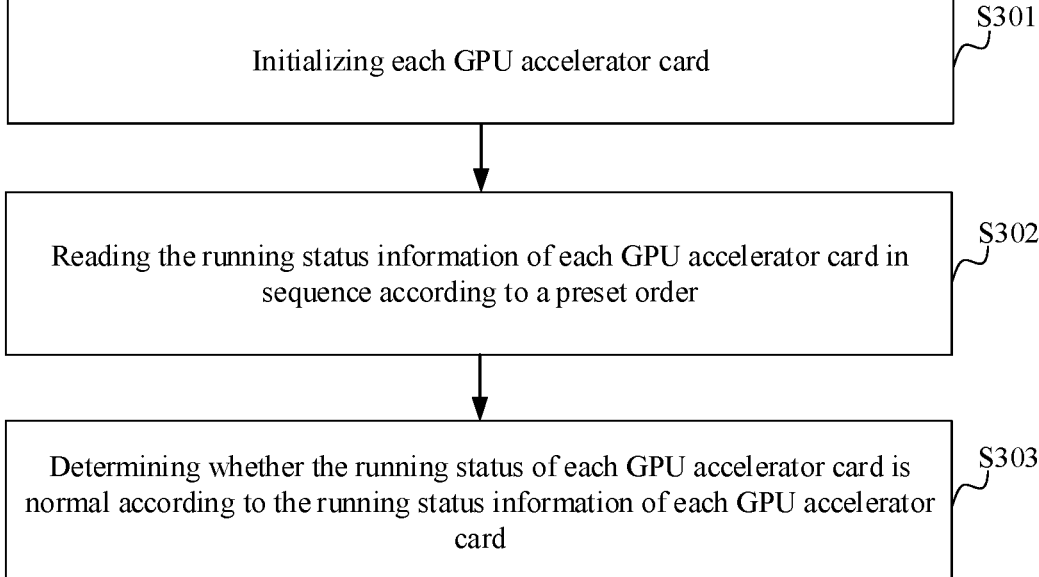
FIG. 3 is a schematic flowchart of steps for determining a running status of GPU accelerator cards according to an embodiment.

In some embodiments, as shown in FIG. 3, before generating the information reading instruction according to the temperature information and other information to be read and transmitting the information reading instruction to each GPU accelerator card, the method further includes the following steps.

In step S301, each GPU accelerator card is initialized.

In step S302, the running status information of each GPU accelerator card is read in sequence according to a preset order.

In step S303, it is determined whether the running status of each GPU accelerator card is normal according to the running status information of each GPU accelerator card.

In the above step S204, generating the information reading instruction according to the temperature information and other information to be read and transmitting the information reading instruction to each GPU accelerator card specifically includes:

generating the information reading instruction according to the temperature information and other information to be read when determining that the running status of each GPU accelerator card is normal, and transmitting the information reading instruction to each GPU accelerator card.

Initialization is a term in the C programming language, which means assigning default values to variables, setting controls to default states, and preparing unprepared items.

The running status information includes but is not limited to the presence information of the GPU accelerator cards, signal interface information, etc.

Specifically, the BMC 101 initializes each GPU accelerator card, reads the running status information of each GPU accelerator card in sequence according to a preset order, and determines whether the running status of each GPU accelerator card is normal according to the running status information of each GPU accelerator card. When determining that the running status of each GPU accelerator card is normal, the BMC 101 generates an information reading instruction according to the temperature information and other information to be read and transmits the information reading instruction to each GPU accelerator card.

In this embodiment, it is determined whether the running status of each GPU accelerator card is normal according to the running status information of each GPU accelerator card, so that the information reading instruction is generated and transmitted to each GPU accelerator card while ensuring that the running status of each GPU accelerator card is normal, improving the practicality of the solution and the accuracy of information reading.

In some embodiments, the method further includes:

obtaining a location information of an abnormal GPU accelerator card when determining that the running status of at least one GPU accelerator card is abnormal, and generating an alarm information for the abnormality of the GPU accelerator card according to the location information of the abnormal GPU accelerator card.

The alarm information for the abnormality of the GPU accelerator card indicates that the presence status or the signal interface status of the corresponding GPU accelerator card is abnormal.

Specifically, when determining that at least one GPU accelerator card is in an abnormal running status, the BMC 101 obtains the location information of the abnormal GPU accelerator card and generates an alarm information for the abnormality of the GPU accelerator card according to the location information of the abnormal GPU accelerator card.

In this embodiment, the alarm information for abnormalities of the GPU accelerator card is generated according to the location information of the abnormal GPU accelerator card. In this way, the alarm function for the abnormal GPU accelerator card is realized, which facilitates relevant technical personnel to perform targeted processing on the abnormal GPU accelerator card, further improving the practicality of this solution.

In some embodiments, in the above-mentioned step S205, adjusting the fan speed according to the temperature information received from each GPU accelerator card specifically includes:

obtaining a maximum temperature value among the temperatures of the GPU accelerator cards according to the temperature information received from each GPU accelerator card, and adjusting the fan speed according to the maximum temperature value and a preset fan speed adjustment rule when the maximum temperature value is less than or equal to a temperature warning value.

The temperature warning value may be a temperature value preset by those skilled in the art according to historical operating experience.

Specifically, the BMC 101 determines the maximum temperature value among the temperatures of the GPU accelerator cards according to the temperature information received from each GPU accelerator card, determines whether the maximum temperature value exceeds the temperature warning value, and adjusts the fan speed according to the maximum temperature value and the preset fan speed adjustment rule when the maximum temperature value is less than or equal to the temperature warning value.

In this embodiment, the maximum temperature value among the temperatures of the GPU accelerator cards is determined, and the fan speed is adjusted according to the maximum temperature value and the preset fan speed adjustment rule. Therefore, based on the data indicator of the maximum temperature value, it effectively ensures the safe operation of all GPU accelerator cards and prevents over-temperature issues of the GPU accelerator cards.

In some embodiments, the method further includes:

when the maximum temperature value exceeds the temperature warning value, adjusting the fan speed to the maximum speed until the maximum temperature becomes less than the temperature warning value due to heat dissipation of each GPU accelerator card.

Specifically, when the maximum temperature value exceeds the temperature warning value, the BMC 101 adjusts the fan speed to the maximum speed until the maximum temperature becomes less than the temperature warning value due to heat dissipation of each GPU accelerator card, and then resumes normal fan speed control.

For example, in order to further reduce the risk of over-temperature of the GPU accelerator card under alternating load conditions, a temperature margin protection strategy is provided. That is, when the BMC detects that the temperature of the GPU accelerator card is higher than a certain set value, it will immediately adjust the fan speed to the maximum, and will not resume normal speed control until the GPU temperature drops below the set value.

In this embodiment, when the maximum temperature value exceeds the temperature warning value, the fan speed is adjusted to the maximum speed until the maximum temperature becomes less than the temperature warning value due to heat dissipation of each GPU accelerator card, thereby further reducing the risk of the over-temperature of the GPU accelerator card under alternating load conditions and effectively eliminating safety hazards caused by high temperature.

In some embodiments, in the above-mentioned step S202, obtaining the maximum number of information readings of each GPU accelerator card within one heat dissipation control cycle according to the information reading frequency and the optimized heat dissipation control cycle includes:

inputting the information reading frequency and the optimized heat dissipation control cycle into a preset information reading quantity calculation model, and obtaining the maximum number of information readings within one heat dissipation control cycle output by the information reading quantity calculation model.

Specifically, the BMC 101 obtains a preset information reading quantity calculation model, inputs the information reading frequency and the optimized heat dissipation control cycle into the information reading quantity calculation model, and obtains the maximum number of information readings within one optimized heat dissipation control cycle output by the information reading quantity calculation model.

In this embodiment, the maximum number of information readings within one optimized heat dissipation control cycle output by the information reading quantity calculation model is obtained by inputting the information reading frequency and the optimized heat dissipation control cycle into the information reading quantity calculation model, such that the maximum number of information readings within one optimized heat dissipation control cycle is obtained quickly and accurately, providing data support for the implementation of the solution.

As shown in FIG. 4, an optimization method for heat dissipation control of GPU accelerator cards in a specific embodiment is provided, which specifically includes the following steps.

In step S401, an information reading frequency and optimized heat dissipation control cycle of each GPU accelerator card are obtained.

In step S402, the information reading frequency and the optimized heat dissipation control cycle are input into a preset information reading quantity calculation model, and the maximum number of information readings within one heat dissipation control cycle output by the information reading quantity calculation model is obtained.

In step S403, other information, in addition to the temperature information, to be read during the current heat dissipation control cycle is determined, ensuring that the sum of the temperature information and other information to be read is less than or equal to the maximum number of information readings.

In step S404, each GPU accelerator card is initialized, the running status information of each GPU accelerator card is read in sequence according to a preset order, and it is determined whether the running status of each GPU accelerator card is normal according to the running status information of each GPU accelerator card.

In step S405, a location information of an abnormal GPU accelerator card is obtained when it is determined that the running status of at least one GPU accelerator card is abnormal, and alarm information for the abnormality of the GPU accelerator card is generated according to the location information of the abnormal GPU accelerator card.

In step S406, an information reading instruction is generated according to the temperature information and other information to be read when it is determined that the running status of each GPU accelerator card is normal, and the information reading instruction is transmitted to each GPU accelerator card.

In step S407, in each heat dissipation control cycle, the maximum temperature value among the temperatures of the GPU accelerator cards is obtained according to the temperature information received from each GPU accelerator card, and the fan speed is adjusted according to the maximum temperature value and a preset fan speed adjustment rule when the maximum temperature value is less than or equal to a temperature warning value.

In step S408, when the maximum temperature value exceeds the temperature warning value, the fan speed is adjusted to the maximum speed until the maximum temperature becomes less than the temperature warning value due to heat dissipation of each GPU accelerator card.

In the above optimization method for heat dissipation control of the GPU accelerator cards, by shortening the heat dissipation control cycle, the BMC can read the temperature information of each GPU accelerator card first, and then read other information of the GPU accelerator card after a period of time, thus ensuring that the BMC can still read and monitor the temperature information in time under high load pressure on the GPU, achieving a timely response of the system fan to changes in the temperatures of the GPU accelerator cards, thus effectively preventing the over-temperature of the GPU accelerator cards and eliminating safety hazards caused by high temperature.

Figure 5:
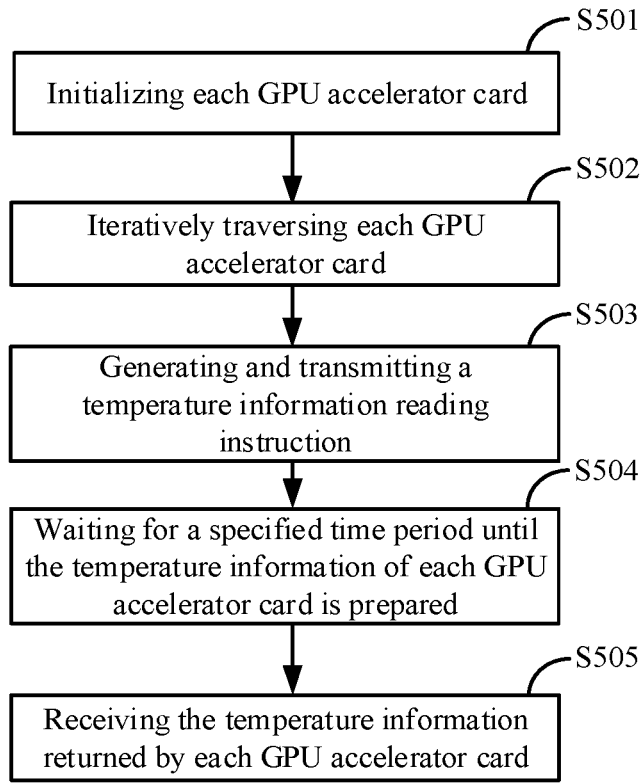
FIG. 5 is a schematic flowchart of an optimization method for heat dissipation control of GPU accelerator cards according to another embodiment.

In order to more clearly illustrate the optimization method for heat dissipation control of the GPU accelerator cards provided by the embodiments of the present disclosure, the optimization method for heat dissipation control of the GPU accelerator cards will be described in detail below with a specific embodiment. In an embodiment, as shown in FIG. 5, another optimization method for heat dissipation control of a GPU accelerator cards is provided, which specifically includes the following steps.

In step S501, each GPU accelerator card is initialized.

In step S502, each GPU accelerator card is iteratively traversed.

In step S503, a temperature information reading instruction is generated and transmitted to each GPU accelerator card.

In step S504, it waits for a specified time period until the temperature information of each GPU accelerator card is prepared.

In step S505, the temperature information returned by each GPU accelerator card is received.

The beneficial effects brought by the above embodiments are as follows.

1) This solution can obtain the temperature of the GPU accelerator cards more quickly and achieve a timely response of the system fan to the GPU temperature.

2) This solution also provides a GPU accelerator card temperature margin protection function to further reduce the risk of over-temperature of the GPU.

It should be understood that although the steps in the flowcharts involved in the above-mentioned embodiments are sequentially shown by the indications of the arrows, these steps are not necessarily executed in the order indicated by the arrows. Unless explicitly stated herein, the execution of these steps is not strictly limited to the order, and these steps can be executed in other orders. Moreover, at least a part of the steps in the flowcharts involved in the above embodiments may include multiple steps or stages, and these steps or stages are not necessarily executed at the same time, but may be performed at different times. The execution order of these steps or stages is not necessarily sequential, but may be performed in turn or alternately with other steps or at least part of the steps or stages in other steps.

Based on the same inventive concept, the embodiments of the present disclosure also provide an optimization device for heat dissipation control of GPU accelerator cards that is configured to implement the above-mentioned optimization method for heat dissipation control of the GPU accelerator cards. The solution for solving the problem provided by the device is similar to the solution described in the above method. Therefore, the specific limitations in the one or more embodiments of the optimization device for heat dissipation control of the GPU accelerator cards provided below can be seen in the foregoing definition of the optimization method for heat dissipation control of the GPU accelerator cards, which is not described again herein.

Figure 6:
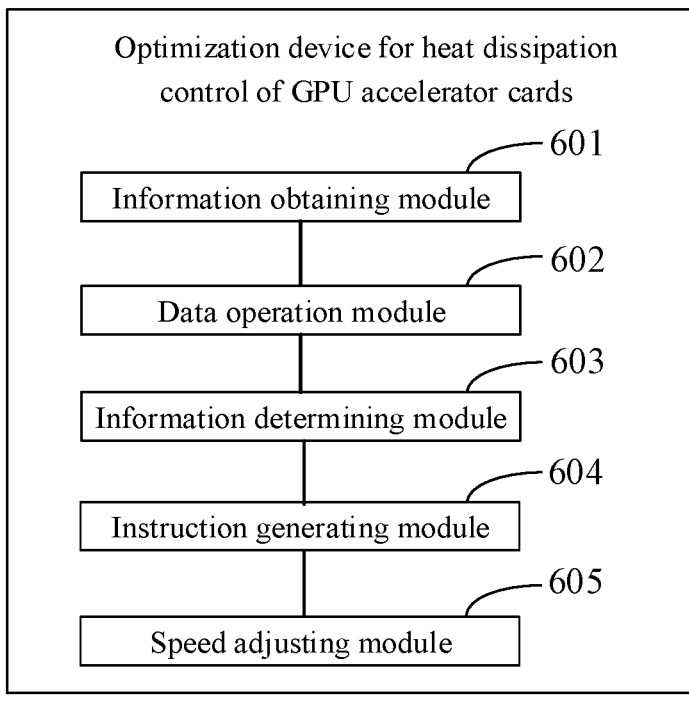
FIG. 6 is a block diagram of a structure of an optimization device for heat dissipation control of GPU accelerator cards according to an embodiment.

In some embodiments, as shown in FIG. 6, an optimization device for heat dissipation control of GPU accelerator cards is provided, including an information obtaining module 601, a data operation module 602, an information determining module 603, an instruction generating module 604, and a speed adjusting module 605.

The information obtaining module 601 is configured to obtain an information reading frequency and optimized heat dissipation control cycle of each GPU accelerator card.

The data operation module 602 is configured to obtain a maximum number of information readings of each GPU accelerator card within one optimized heat dissipation control cycle according to the information reading frequency and the optimized heat dissipation control cycle.

The information determining module 603 is configured to determine other information, in addition to the temperature information, to be read during the current heat dissipation control cycle, ensuring that the sum of the temperature information and other information to be read is less than or equal to the maximum number of information readings.

The instruction generating module 604 is configured to generate an information reading instruction according to the temperature information and other information to be read and transmit the information reading instruction to each GPU accelerator card.

The speed adjusting module 605 is configured to adjust the fan speed according to the temperature information received from each GPU accelerator card during each heat dissipation control cycle.

In some embodiments, the optimization device for heat dissipation control of the GPU accelerator cards also includes a status determining module configured to initialize each GPU accelerator card, sequentially read the running status information of each GPU accelerator card according to a preset order, and determine whether the running status of each GPU accelerator card is normal according to the running status information of each GPU acceleration card.

The instruction generating module 604 is also configured to generate an information reading instruction according to the temperature information and other information to be read when determining that the running status of each GPU accelerator card is normal, and transmit the information reading instruction to each GPU accelerator card.

In some embodiments, the optimization device for heat dissipation control of the GPU accelerator cards also includes an abnormal alarm module that is configured to obtain a location information of an abnormal GPU accelerator card when it is determined that the running status of at least one GPU accelerator card is abnormal, and generate an alarm information for the abnormality of the GPU accelerator card according to the location information of the abnormal GPU accelerator card.

In some embodiments, the speed adjusting module 605 is also configured to obtain the maximum temperature value among the temperatures of the GPU accelerator cards according to the temperature information received from each GPU accelerator card, and adjust the fan speed according to the maximum temperature value and a preset fan speed adjustment rule when the maximum temperature value is less than or equal to a temperature warning value.

In some embodiments, the optimization device for heat dissipation control of the GPU accelerator cards also includes a protection module that is configured to, when the maximum temperature value exceeds the temperature warning value, adjust the fan speed to the maximum speed until the maximum temperature becomes less than the temperature warning value due to heat dissipation of each GPU accelerator card.

In some embodiments, the data operation module 602 is also configured to input the information reading frequency and the optimized heat dissipation control cycle into a preset information reading quantity calculation model, and obtain the maximum number of information readings within one heat dissipation control cycle output by the information reading quantity calculation model.

The modules in the optimization device for heat dissipation control of the GPU accelerator cards can be implemented in whole or in part by software, hardware, and combinations thereof. Each of the above modules may be embedded in or independent of a processor in a computer device in a form of hardware, or may be stored in a memory of the computer device in a form of software, so as to be called by the processor to perform the operations corresponding to the above modules.

In some embodiments, a computer device is provided. The computer device may be a terminal or a server, and an internal structure diagram thereof may be shown in FIG. 7.

The computer device includes a processor, a memory, an input/output interface (also referred to as I/O), and a communication interface. The processor, the memory, and the input/output interface are connected through a system bus, and the communication interface is connected to the system bus through the input/output interface. The processor of the computer device is configured to provide computing and control capabilities. The memory of the computer device includes a non-transitory storage medium and an internal memory. The non-transitory storage medium stores an operating system, a computer program, and a database. The internal memory provides an environment for running the operating system and computer program in the non-transitory storage medium. The input/output interface of the computer device is configured to exchange information between the processor and external devices. The communication interface of the computer device is configured to communicate with an external terminal through a network. When the computer program is executed by the processor, the heat dissipation control optimization method for the GPU accelerator card is implemented.

Figure 7:
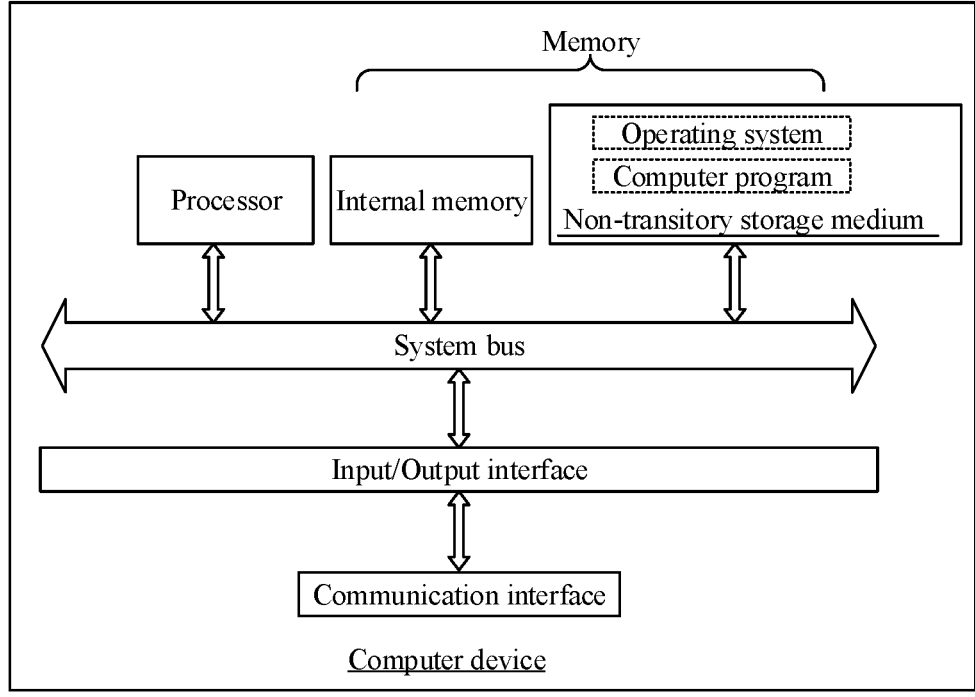
FIG. 7 is diagram showing an internal structure of a computer device according to an embodiment.

Those skilled in the art should understand that the structure shown in FIG. 7 is merely a block diagram of a portion of the structure associated with the solution of the present disclosure, and does not constitute a limitation on the computer device to which the solution of the present disclosure is applied. A specific computer device may include more or less components than shown in the figure, or may combine certain components, or may have different component arrangements.

In some embodiments, a computer device is also provided, which includes a memory and a processor. A computer program is stored in the memory. The processor, when executing the computer program, performs the steps of the method in the various embodiments described above.

In some embodiments, a computer-readable storage medium is provided, in which a computer program is stored. When the computer program is executed by a processor, the steps of the method in the various embodiments described above are implemented.

In some embodiments, a computer program product is provided, which includes a computer program. When the computer program is executed by a processor, the steps of the method in the various embodiments described above are implemented.

It should be noted that the user information (including but not limited to user device information, user personal information, etc.) and data (including but not limited to data for analysis, stored data, displayed data, etc.) referred to in the present disclosure are all information and data authorized by the user or fully authorized by all parties, and the collection, use and processing of relevant data need to comply with the relevant laws, regulations and standards of relevant countries and regions.

Those of ordinary skill in the art can understand that all or part of the processes in the methods of the above embodiments can be implemented by instructing relevant hardware through a computer program. The computer program can be stored in a non-transitory computer-readable storage medium, and when executed, perform the processes of the methods in the embodiments described above. Any reference to the memory, database or other medium used in the embodiments provided in the present disclosure may include at least one of non-transitory and transitory memory. The non-transitory memory may include read-only memory (ROM), magnetic tape, floppy disk, flash memory, optical memory, high-density embedded non-transitory memory, resistive random access memory (ReRAM), magnetoresistive random access memory (MRAM), ferroelectric random access memory (FRAM), phase change memory (PCM), graphene memory, etc. The transitory memory may include random access memory (RAM) or external cache memory, etc. For illustration rather than limitation, the RAM may be in various forms, such as static random access memory (SRAM) or dynamic random access memory (DRAM), etc. The databases involved in the various embodiments provided in the present disclosure may include at least one of a relational database and a non-relational database. The non-relational databases may include, without limitation, a blockchain-based distributed databases, etc. The processors involved in the various embodiments provided in the present disclosure may be general purpose processors, central processing units, graphics processors, digital signal processors, programmable logic devices, quantum computing based data processing logic devices, etc., without limitation.

The technical features of the foregoing embodiments may be freely combined. For brevity, not all possible combinations of the technical features in the foregoing embodiments are described. However, the combinations of these technical features should be considered to be included within the scope of this disclosure, as long as the combinations are not contradictory.

The above-described embodiments only express several implementations of the present disclosure, the descriptions of which are specific and detailed, but should not be construed as a limitation of the scope of the present disclosure. It should be noted that, for those of ordinary skill in the art, variations and improvements can be made without departing from the concept of the present disclosure, which all belong to the protection scope of the present disclosure. Therefore, the scope of protection of the present disclosure shall be subject to the attached claims.

What is claimed is:

1. An optimization method for heat dissipation control of GPU accelerator cards, which is applied to a Baseboard Management Controller (BMC), wherein the method comprises:

obtaining an information reading frequency and an optimized heat dissipation control cycle of each GPU accelerator card;

obtaining a maximum number of information readings of each GPU accelerator card within one optimized heat dissipation control cycle according to the information reading frequency and the optimized heat dissipation control cycle;

determining other information, in addition to a temperature information, to be read during a current heat dissipation control cycle, ensuring that a sum of the temperature information and the other information to be read is less than or equal to the maximum number of information readings;

generating an information reading instruction according to the temperature information and the other information to be read, and transmitting the information reading instruction to each GPU accelerator card; and in each optimized heat dissipation control cycle, adjusting a fan speed according to the temperature information received from each GPU accelerator card;

wherein, before generating the information reading instruction according to the temperature information and the other information to be read and transmitting the information reading instruction to each GPU accelerator card, the method further comprising:

initializing each GPU accelerator card;

reading a running status information of each GPU accelerator card in sequence according to a preset order; and determining whether the running status of each GPU accelerator card is normal according to the running status information of each GPU accelerator card;

wherein generating the information reading instruction according to the temperature information and the other information to be read and transmitting the information reading instruction to each GPU accelerator card comprises:

generating the information reading instruction according to the temperature information and the other information to be read when determining that the running status of each GPU accelerator card is normal, and transmitting the information reading instruction to each GPU accelerator card.

2. The method according to claim 1, further comprising:

obtaining a location information of an abnormal GPU accelerator card when determining that the running status of at least one GPU accelerator card is abnormal; and generating an alarm information for an abnormality of the GPU accelerator card according to the location information of the abnormal GPU accelerator card.

3. The method according to claim 1, wherein the adjusting the fan speed according to the temperature information received from each GPU accelerator card comprises:

obtaining a maximum temperature value among temperatures of the GPU accelerator cards according to the temperature information received from each GPU accelerator card; and adjusting the fan speed according to the maximum temperature value and a preset fan speed adjustment rule when the maximum temperature value is less than or equal to a temperature warning value.

4. The method according to claim 3, further comprising:

when the maximum temperature value exceeds the temperature warning value, adjusting the fan speed to a maximum speed until the maximum temperature becomes less than the temperature warning value due to heat dissipation of each GPU accelerator card.

5. The method according to claim 1, wherein the obtaining the maximum number of information readings of each GPU accelerator card within one optimized heat dissipation control cycle according to the information reading frequency and the optimized heat dissipation control cycle comprises:

inputting the information reading frequency and the optimized heat dissipation control cycle into a preset information reading quantity calculation model, and obtaining the maximum number of information readings within one optimized heat dissipation control cycle output by the information reading quantity calculation model.

6. A computer device, comprising a memory and a processor, the memory comprising a computer program stored therein, wherein the processor, when executing the computer program, performs an optimization method for heat dissipation control of GPU accelerator cards, the method comprising:

obtaining an information reading frequency and an optimized heat dissipation control cycle of each GPU accelerator card;

obtaining a maximum number of information readings of each GPU accelerator card within one optimized heat dissipation control cycle according to the information reading frequency and the optimized heat dissipation control cycle;

determining other information, in addition to a temperature information, to be read during a current heat dissipation control cycle, ensuring that a sum of the temperature information and the other information to be read is less than or equal to the maximum number of information readings;

generating an information reading instruction according to the temperature information and the other information to be read, and transmitting the information reading instruction to each GPU accelerator card; and in each optimized heat dissipation control cycle, adjusting a fan speed according to the temperature information received from each GPU accelerator card;

wherein before generating the information reading instruction according to the temperature information and the other information to be read and transmitting the information reading instruction to each GPU accelerator card, the method further comprising:

initializing each GPU accelerator card;

reading a running status information of each GPU accelerator card in sequence according to a preset order; and determining whether the running status of each GPU accelerator card is normal according to the running status information of each GPU accelerator card;

wherein generating the information reading instruction according to the temperature information and the other information to be read, and transmitting the information reading instruction to each GPU accelerator card comprises:

generating the information reading instruction according to the temperature information and the other information to be read when determining that the running status of each GPU accelerator card is normal, and transmitting the information reading instruction to each GPU accelerator card.

7. The computer device according to claim 6, wherein the method further comprises:

obtaining a location information of an abnormal GPU accelerator card when determining that the running status of at least one GPU accelerator card is abnormal; and generating an alarm information for an abnormality of the GPU accelerator card according to the location information of the abnormal GPU accelerator card.

8. The computer device according to claim 6, wherein the adjusting the fan speed according to the temperature information received from each GPU accelerator card comprises:

obtaining a maximum temperature value among the temperatures the GPU accelerator cards according to the temperature information received from each GPU accelerator card; and adjusting the fan speed according to the maximum temperature value and a preset fan speed adjustment rule when the maximum temperature value is less than or equal to a temperature warning value.

9. The computer device according to claim 8, wherein the method further comprises:

when the maximum temperature value exceeds the temperature warning value, adjusting the fan speed to a maximum speed until the maximum temperature becomes less than the temperature warning value due to heat dissipation of each GPU accelerator card.

10. The computer device according to claim 6, wherein the obtaining the maximum number of information readings of each GPU accelerator card within one optimized heat dissipation control cycle according to the information reading frequency and the optimized heat dissipation control cycle comprises:

inputting the information reading frequency and the optimized heat dissipation control cycle into a preset information reading quantity calculation model, and obtaining the maximum number of information readings within one optimized heat dissipation control cycle output by the information reading quantity calculation model.

11. A non-transitory computer-readable storage medium with a computer program stored therein, wherein when the computer program is executed by a processor, an optimization method for heat dissipation control of GPU accelerator cards is performed, the method comprising:

obtaining an information reading frequency and an optimized heat dissipation control cycle of each GPU accelerator card;

obtaining a maximum number of information readings of each GPU accelerator card within one optimized heat dissipation control cycle according to the information reading frequency and the optimized heat dissipation control cycle;

determining other information, in addition to a temperature information, to be read during a current heat dissipation control cycle, ensuring that a sum of the temperature information and the other information to be read is less than or equal to the maximum number of information readings;

generating an information reading instruction according to the temperature information and the other information to be read, and transmitting the information reading instruction to each GPU accelerator card; and in each optimized heat dissipation control cycle, adjusting a fan speed according to the temperature information received from each GPU accelerator card;

wherein, before generating the information reading instruction according to the temperature information and the other information to be read and transmitting the information reading instruction to each GPU accelerator card, the method further comprising:

initializing each GPU accelerator card;

reading a running status information of each GPU accelerator card in sequence according to a preset order; and determining whether the running status of each GPU accelerator card is normal according to the running status information of each GPU accelerator card;

wherein generating the information reading instruction according to the temperature information and the other information to be read and transmitting the information reading instruction to each GPU accelerator card comprises:

generating the information reading instruction according to the temperature information and the other information to be read when determining that the running status of each GPU accelerator card is normal, and transmitting the information reading instruction to each GPU accelerator card.

12. The non-transitory computer-readable storage medium according to claim 11, wherein the method further comprises:

obtaining a location information of an abnormal GPU accelerator card when determining that the running status of at least one GPU accelerator card is abnormal; and generating an alarm information for an abnormality of the GPU accelerator card according to the location information of the abnormal GPU accelerator card.

13. The non-transitory computer-readable storage medium according to claim 11, wherein the adjusting the fan speed according to the temperature information received from each GPU accelerator card comprises:

obtaining a maximum temperature value among temperatures of the GPU accelerator cards according to the temperature information received from each GPU accelerator card; and adjusting the fan speed according to the maximum temperature value and a preset fan speed adjustment rule when the maximum temperature value is less than or equal to a temperature warning value.

14. The non-transitory computer-readable storage medium according to claim 13, wherein the method further comprises:

when the maximum temperature value exceeds the temperature warning value, adjusting the fan speed to a maximum speed until the maximum temperature becomes less than the temperature warning value due to heat dissipation of each GPU accelerator card.

15. The non-transitory computer-readable storage medium according to claim 11, wherein the obtaining the maximum number of information readings of each GPU accelerator card within one optimized heat dissipation control cycle according to the information reading frequency and the optimized heat dissipation control cycle comprises:

inputting the information reading frequency and the optimized heat dissipation control cycle into a preset information reading quantity calculation model, and obtaining the maximum number of information readings within one optimized heat dissipation control cycle output by the information reading quantity calculation model.

\* \* \* \* \*